Nov. 20, 1951     N. C. PRICE     2,575,683
INTERCOOLER AND CONTROL SYSTEM FOR TURBO POWER PLANTS
Filed Jan. 13, 1947     5 Sheets-Sheet 5

INVENTOR.
NATHAN C. PRICE
BY
George C. Sullivan
Agent

Patented Nov. 20, 1951

2,575,683

UNITED STATES PATENT OFFICE 2,575,683

INTERCOOLER AND CONTROL SYSTEM FOR TURBO POWER PLANTS

Nathan C. Price, Los Angeles, Calif., assignor to Lockheed Aircraft Corporation, Burbank, Calif.

Application January 13, 1947, Serial No. 721,782

11 Claims. (Cl. 60—35.6)

This invention relates to gas turbine power plants, and has more particular reference to intercooling and control systems for power plants of that type. It is a general object of the invention to provide a compact, rugged, and efficient intercooler and effective automatic associated controls for application to or embodiment in turbo power plants employing compressed air as the working fluid.

This application is a continuation-in-part of my copending application entitled "Power Plant" filed January 9, 1945, Serial No. 571,999½, now Patent No. 2,526,409, dated Oct. 17, 1950.

The efficiency of a turbo power plant employing air as the working fluid can be increased and maintained at a high level by controlling the temperature of the air supplied to the combustion chamber. For example, where multi-stage compressors are employed, a high overall thermal efficiency is obtained by preserving a substantially isothermal condition in the air compressor flow system of the plant, even though variations in the temperature and pressure of the ambient air may occur. This preservation of substantially isothermal conditions in the stream of the working fluid is of particular importance in the case of turbo power plants designed for the propulsion of aircraft. Furthermore, where there are variations in the air pressure at the inlet of the compressor resulting from changes in the aircraft speed and ambient atmospheric conditions, it is important to maintain a substantially constant ratio between the absolute air pressure at the intercooler and the mass air flow through the power plant under various load conditions and at the different altitudes of flight.

The present invention is directed to intercooler means and a control system for maintaining substantially isothermal conditions in the compressed air or working medium being supplied to the combustion chamber and for preserving a substantially constant ratio between the absolute air pressure at the intercooler and the air mass flow through the power plant system. An object of the invention is to provide a dependable automatic control for the coolant supply system of the intercooler to obtain the substantially constant isothermal condition in the compressed air system of the power plant. The automatic control operates to maintain the temperature of the air at the exit side of the intercooler substantially constant by a thermostatic regulation of the coolant supply for the intercooler.

Another object of the invention is to provide an intercooler means and an automatic control system of the character referred to above, used in combination with an automatic means for preserving a substantially constant ratio between the absolute air pressure at the intercooler and the air mass flow through the power plant so that by suitable regulation of the fuel supply to the combustion chamber and pressure conditions in the turbine, a substantially constant design Q/N is obtained throughout the compressor and turbine blading and a generally constant Mach number is obtained in the turbine and compressor. The ratio of the absolute air pressure at the intercooler to the air mass flow is maintained substantially constant by the automatic variation in the speed of operation of the first stages of the compressor blading, while as above mentioned, the temperature of the compressed air leaving the intercooler and entering the high speed or second stage compressor is also maintained substantially constant. These two factors of control are instrumental in bringing about efficient, generally constant internal power plant conditions throughout a wide range of loads and where the external pressures and temperatures vary greatly.

Another object of the invention is to provide an intercooler for arrangement in the flow path between the first and second stage compressors which is shaped and proportioned for convenient installation in the casing of the high pressure compressor, and which is constructed so that substantially uniform flow distribution is obtained through its core without entailing excessive or detrimental air bends. The intercooler may be in the form of an annular or tubular structure readily positioned in the compressor casing and is designed so that the air flows in a generally radial direction through the multitude of intercooler passages with only minor bends or changes in direction.

Another object of the invention is to provide an intercooler of strong durable construction inexpensively fabricated from a plurality of sectional laminations or "sandwiches." The intercooler is composed of a plurality of inexpensive stamped sheet metal parts assembled in brazed-together laminations or "sandwiches," each providing an extended flow passage for a liquid coolant and a plurality of flow paths for the air. These assemblies or sandwiches are each simple units constructed at low cost and easily assembled together to constitute the composite core of the intercooler.

It is another object of the invention to provide an intercooler of the class referred to in which the above mentioned laminated assemblies or sandwiches may be individually removed and replaced in the event they become clogged or develop leaks.

It is another object of the invention to provide an intercooler which provides a multiplicity of serpentine channels for carrying the coolant, each channel having its major or elongated arms extending axially of the core and which also provides a large number of air flow paths at each side of each serpentine coolant channel, the air flow paths extending transversely of and in close relation to the major arms of the serpentine channel to effect an extensive and efficient heat transference between the compressed air and the coolant. The many major elongate arms of the serpentine coolant duct are each successively intersected at spaced points by the lines or planes occupied by the air flow paths and the latter are preferably angular or chevron shaped to increase their areas of intersection or "contact" with the lines of the serpentine coolant channels.

A further object of the invention is to provide an intercooler of the character referred to wherein the above mentioned sandwiches or laminated assemblies are related one to the other so that there is an equal number of air flow paths at each side of each coolant channel to effect a uniform and distributed heat absorption or cooling effect.

Other objects and features of the invention will be readily understood from the following detailed description of a typical preferred form of the invention wherein reference will be made to the accompanying drawings in which.

The invention is herein disclosed associated with a turbo jet power plant of the type described in my copending application above referred to and intended primarily for the propulsion of aircraft. It is to be understood that this is merely one typical application and the invention is not to be construed as limited or restricted to the form or details of the power plant herein disclosed.

Figure 1:
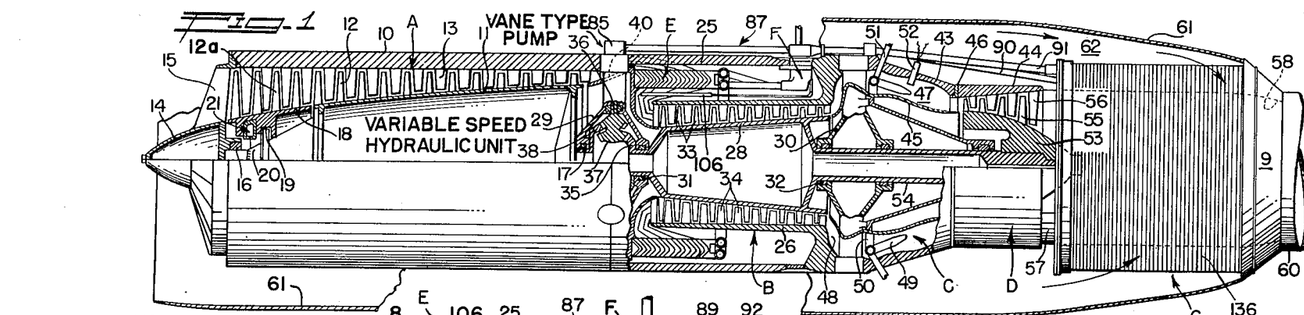
Figure 1 is longitudinal sectional view of an internal combustion turbo power plant embodying the features of the invention, with certain parts appearing in side elevation.

The power plant as illustrated in Figure 1 includes a first stage compressor A, a second stage compressor B, a combustion chamber C and a turbine D for driving the compressors.

The compressors A and B are of the axial flow type, the compressor A being arranged to receive ram air during flight of the aircraft and the compressor B receiving the compressed air from compressor A. The compressor A has an elongate cylindrical casing 10 open at its forward end for the reception of the ram air. A rotor 11 of rearwardly increasing diameter rotates in the casing 10 and carries a plurality of rows of blading 12 operating between stator blading 13 on the casing. A spider 14 at the forward end of the casing carries bearings for the rotor 11 and has supporting webs 15 which also serve as counter blades for the forward row of compressor blades 12. The rotor 11 is journaled at a bearing 16 on the spider 14 and at a cylindrical land 17 adjacent its rear end to rotate about a longitudinal axis. The forward portion of the low pressure axial flow compressor has an independently rotatable rotor or drum section 18 carrying several rows of blading 12ᵃ. The section 18 is journaled on a bearing land 19 provided on a central hub 20 at the forward end of the rotor 11.

In accordance with the invention the drum section 18 is independently driven and controlled so that its speed of rotation may be varied with respect to the speed of the main rotor 11 to compensate for variations in air pressure at the inlet spider 14 arising from the speed of the aircraft, altitude and atmospheric conditions. The drive for the independent drum section 18 is in the form of a variable speed hydraulic unit 21. This hydraulic drive unit which is diagrammatically illustrated in Figure 12, may be of the type disclosed in Patent No. 2,379,183, issued June 26, 1945. The drive comprises a toroidal fluid-filled container 22, a portion of which is associated with the driving member or rotor 11 and a portion of which is in association with the driven drum section 18. This latter driven portion of the container 22 carries internal radial vanes 23 and the driving portion carries variable-angle vanes 24 operating in the fluid circulating path within the container. The vanes 24 are movable or pivotable so that their angle of attack may be changed to vary the speed relationship between the rotor 11 and the forward section 18 of the compressor A. The means for adjusting the angle of attack of the vanes 24 to control operation of the drum section 18 will be subsequently described in connection with the other controls of the invention.

The high pressure axial flow compressor B comprises an outer casing 25 continuing rearwardly from the casing 10 and an inner casing 26 spaced within the outer casing. A rotor 28 of rearwardly increasing diameter is arranged in the casing 26 and is supported for rotation independently of the rotor 11 of the compressor A. A spider 29 is secured between the casings 10 and 25, and a similar spider 30 is provided at the rear end of the casing 25. Suitable bearings 31 and 32 journal the ends of the rotor 28 in the spiders. Rows of blades 33 on the rotor 28 operate between rows of stator blades 34 on the inner casing 26.

The rotor 28 of the high pressure axial flow compressor B is driven at a greater velocity than the rotor 11 of the low pressure compressor A, there being a speed reducing gearing between the rotors for effecting this speed differential. The gearing includes a beveled drive gear 35 on the forward end of the rotor 28 and one or more pinion clusters 37 carried by right-angled shafts 36. The driving gear 35 meshes with the large diameter pinions of the clusters 37 and the small diameter pinions of the clusters mesh with a driven gear 38 fixed on the rear end of the low pressure compressor rotor 11.

The low pressure axial flow compressor A has an annular rearwardly extending discharge duct 40 and the high pressure compressor B has an annular inlet 41 of considerably smaller diameter. The compressed air from the low pressure compressor A is directed or conducted from the duct 40 to the inlet 41 of the compressor B by an annular passage 42 which extends rearwardly and inwardly from the duct 40 and then inwardly and forwardly to the inlet 41 of compressor B. The intercooler of the invention is arranged in or across this passage 42, as will be later described in more detail. A plurality of direction-changing guides or vanes 8 is provided in the passage 42.

The combustion chamber C includes a tubular frusto-conical casing 43 extending rearwardly from the casing 25 and the casing 44 of the turbine D, in turn, constitutes a cylindrical rearward extension of the casing 43. An annular shroud 45 is supported in spaced concentric relation within the casing 43 by the spider 30 and a nozzle ring 46. The casing 43 and the shroud 45 together define an annular combustion space 47. An annular passage 48 connects the discharge of the high pressure compressor B with the space 47 to deliver the compressed air thereto. A plurality of spaced nozzles 49 is arranged in the forward portion of the combustion space for discharging a suitable fuel or fuel mixture therein. The nozzles 49 are carried by an annular supply manifold 50, which in turn is supplied with fuel by a pipe 51. One or more igniting plugs 52 enter the combustion space 47 to initiate combustion of the fuel and air mixture therein.

The turbine D includes a rotor 53 rotatable within the casing 44 and fixed on a central shaft 54. The shaft 54 is journaled in the shroud 45 and the spider 30, and is secured to the rotor 28 of the high pressure compressor B to drive the same. The rotor 53 is of conoidal configuration and carries rows of axial flow buckets 55 operating between rows of intermediate turbine blades 56 on the casing 44. The gases of combustion and the heated unconsumed compressed air which drive the turbine D are conveyed rearwardly from the expansion zone of the turbine by a duct or pipe 57. This tail pipe 57 may be annular or circular in transverse cross section, and is somewhat convergent at its rear end. The convergent rear portion 58 of the pipe 57 discharges into what I will term the augmenter 60 of the propulsive nozzle (not shown). The augmenter 60 is a tubular member larger in diameter than the convergent pipe portion 58, and its forward end is spaced from the pipe to leave a rather narrow annular passage 59 for admitting external air to the stream of exhausting gases. The augmenter 60 has a flared annular apron 9 on its forward end joining a tubular shroud 61. The shroud 61 surrounds the power plant with clearance leaving an annular air passage 62 for conducting air to the augmenter passage 59. The shroud 61 may receive air from any selected source. For example, it may be open at its forward end to receive ram air. In any event, there is a rearward flow of air through the passage 62 as indicated by the arrow in Figure 2.

Figure 5:
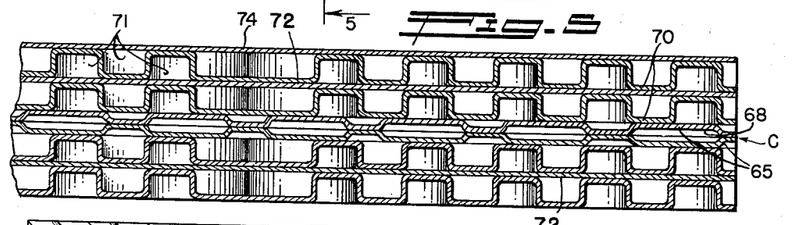
Figure 5 is an enlarged fragmentary sectional view of one of the intercooler sandwiches taken as indicated by line 5—5 on Figure 4.
Figures 6, 7:
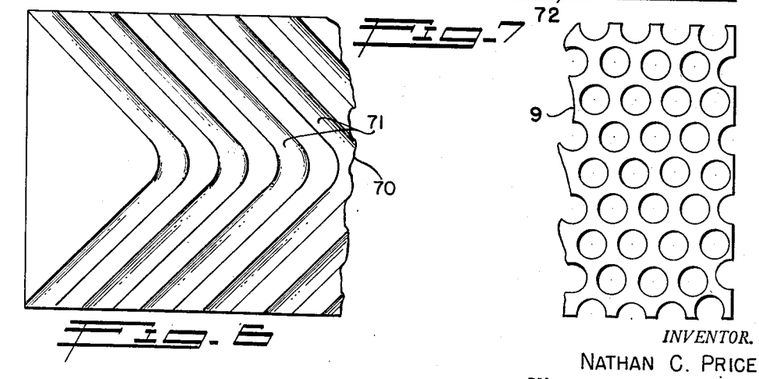
Figure 6 is a greatly enlarged fragmentary side elevation of one of the fin plates of the intercooler.
Figure 7 is a greatly enlarged fragmentary elevational view of one of the foraminous bonding or brazing sheets employed in fabricating the intercooler.
Figures 8, 9, 10, 11:
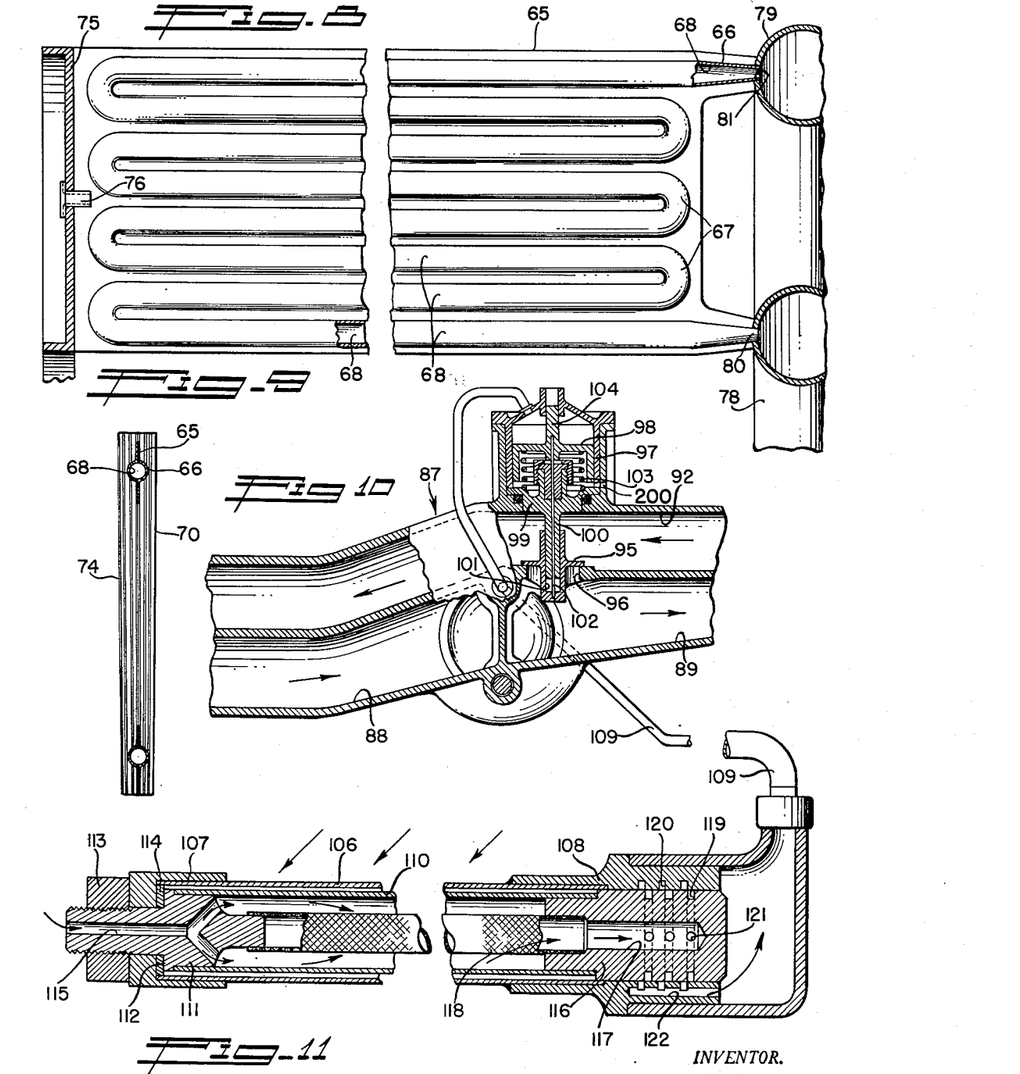
Figure 8 is an enlarged sectional view of the intercooler taken in a plane at the face of one of the tube providing plates.
Figure 9 is a sectional view taken as indicated by line 9—9 on Figure 3.
Figure 10 is an enlarged sectional view illustrating the coolant by-pass valve.
Figure 11 is an enlarged longitudinal sectional view of the thermostat and valve for controlling the by-pass valve of Figure 10.

The intercooler E of the invention is arranged in the path of the compressed air passing from the low speed compressor A to the high speed compressor B. It is housed within the casing 25, being located in the forward portion of the annular space between the two concentric casings 25 and 26. Where the compressor casings 25 and 26 are circular in cross section, the intercooler E is preferably of a similar configuration. As best shown in Figure 1, the intercooler E is proportioned so as to be spaced from the opposing concentric walls of the two casings and to intersect the above described air passage 42 by extending axially therethrough. In accordance with the invention, the intercooler E is comprised of a multiplicity of like or identical assemblies, each providing an extended tortuous passage for the cooling medium and a plurality of flow paths for the compressed air. These are the assemblies which I have hereinabove referred to as sandwiches, and each includes a pair of tube sheets 65; see Figures 5, 8 and 9. The tube sheets 65 are formed of thin sheet metal such as beryllium copper and are elongate rectangular members. Integral ears or legs 66 project axially or rearwardly from each rear corner to each sheet. Each tube sheet 65 is pressed or formed to have a continuous uninterrupted serpentine surface groove or channel 68. The channel 68 of each sheet 65 has its beginning at the extremity of one leg 66, and its terminus at the extremity of the other leg. Each channel 68, between these two points or ends, constitutes a series of closely spaced parallel runs or passes connected by bends 67, as shown in Figure 8. The elongate passes and bends of the channels 68 are broad and relatively shallow as shown in Figure 5, whereas the portions of the channels in the legs 66 are substantially semi-circular in cross section. The lands or portions of the sheets 65 between the runs of the channels 68 are flat, as are the marginal parts of the sheets. The two sheets are arranged back-to-back to have their respective channels 68 in mating communication, and are then furnace brazed together so that the two channels form a continuous fluid path or passage closed to the atmosphere except at its opposite ends. To facilitate a uniform brazed bond or connection between the sheets 65, it is preferred to arrange a thin perforate sheet 9 of silver solder, such as shown in Figure 7, between the sheets to prepare them for the brazing. Instead of the perforated sheet 9 such as shown in Figure 7, it may be preferred to cut out an extremely thin sheet of silver solder to conform to the lands or flat surfaces of the sheets 65. It has been found that the thin silver solder sheet 9 assures a uniform bond between the tube sheets 65 without clogging or reducing the capacity of the channel 68. Subsequent to the brazing together of the tube plates 65, the plates are thoroughly cleansed, both internally and externally, to remove the excess flux and oxides.

Each sandwich assembly of the intercooler E further includes one or more fin sheets 70 at each side of the pair of brazed together tube sheets 65. In the preferred construction illustrated there are two fin sheets 70 at each side of the tube sheets. The fin sheets 70 are rectangular parts of approximately the same dimensions as the tube sheets 65, and are preferably formed of copper or other material having high thermal conductivity. The sheets 70 are identical and each is formed with a plurality of adjacent parallel generally U-shaped grooves 71. The grooves 71 are in close equally spaced relation so that the sheets 70 are in effect corrugated. The grooves or corrugations 71 extend transversely of the sheets; that is, they extend from one longitudinal edge to the other of each sheet. The grooves or corrugations 71 define the air paths through the core of the intercooler. While in some applications the corrugations 71 may be straight, it is preferred in the present case to make them angular or substantially chevron shaped in plan view, to keep the air flow therethrough within the turbulent range, and thus obtain a high order of heat transfer between the air and the coolant. The angular configuration of the channels or corrugations 71 also desirably increases the area of "contact" of the coolant flow in the passages 68 and the air flow in the corrugations. Furthermore, in the particular core installation shown in Figure 1, the air enters and leaves the faces of the core at an acute angle due to the shape of air flow passages surrounding the intercooler E. The chevron shape of the corrugations 71 is biased in the direction of these acute angles to keep pressure drop losses to a minimum as the air enters or leaves the core faces.

Figure 4:
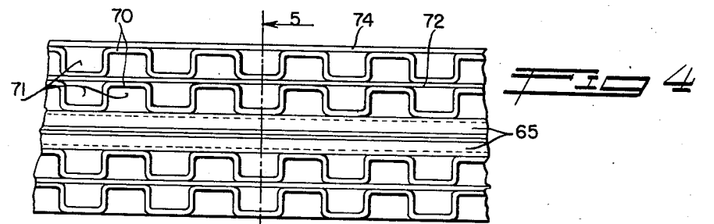
Figure 4 is a greatly enlarged fragmentary elevational view taken substantially as indicated by line 4—4 on Figure 3.

As shown in Figures 4 and 5, the fin sheets 70 at opposite sides of the assembled tube sheets 65 are secured directly to the tube sheets so that the corrugations 71 on their inner sides have their open faces or sides closed by the opposing tube sheets 65. Where there are two fin sheets 70 at each side of the assembled tube sheets 65, a flat plain sheet 72 of copper, or other material of high thermal conductivity, is arranged between each pair of adjacent fin sheets to separate the opposing corrugations or air paths of the two fin sheets. The fin sheets 70 are furnace brazed to the tube sheets 65 and the separator sheets 72 and fin sheets are also furnace brazed together. Extremely thin sheets of silver solder, similar to the sheet illustrated in Figure 7, are interposed between the several sheets 71 and 72 to obtain dependable uniform brazed connections. Instead of using the perforated silver solder sheets, it may be preferred to employ silver solder sheets cut out to correspond with the abutting corrugated lands.

As mentioned above, the several sandwich assemblies of the intercooler are arranged one against the other in an annular series to make up the intercooler core. In order to divide or separate the air channels on the outer faces of the adjacent sandwiches, I provide a sheet 74 on one side face of each sandwich. The sheets 74 are suitably brazed on the lands of the outer corrugated fin sheets 70 in the same manner as the other members of the multi-layer assemblies. The plain outer sheets 74 are on corresponding faces of the sandwiches and thus close off the sides of the air passages or corrugations on the adjoining sandwiches. As best illustrated in Figure 9, each sandwich assembly of the intercooler is slightly tapered or "keystone" shaped so that when the plurality of sandwiches are assembled one against the other they constitute an annular structure of circular cross section. Following the several brazing operations, each sandwich is subjected to a pickle bath or wash to remove the flux and oxides.

Figures 12, 13:
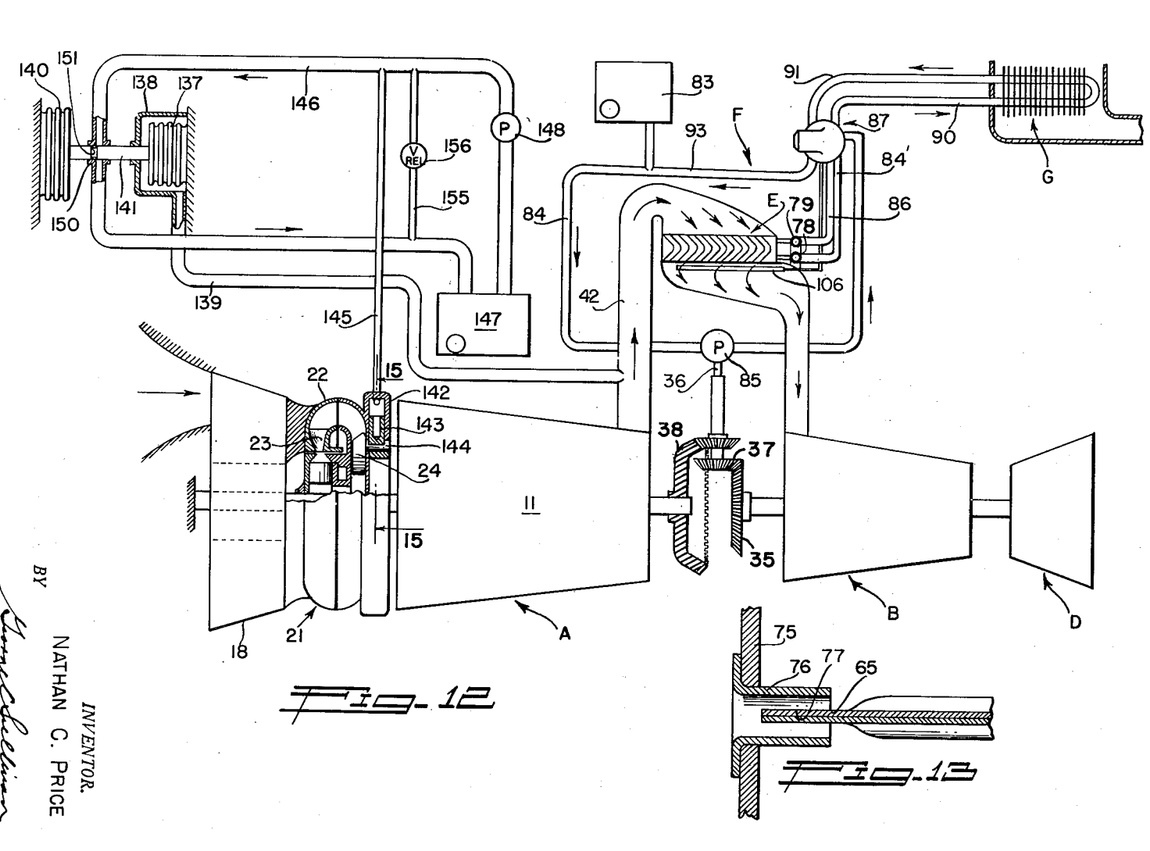
Figure 12 is a diagrammatic view of the power plant and the controls for the compressor and intercooler.
Figure 13 is an enlarged fragmentary sectional view of one of the rivet attachments for the intercooler.

Simple and highly effective means are provided for mounting and supporting the above described multi-layer assemblies or sandwiches so as to constitute the core of the intercooler. These means include an annular supporting member 75 arranged at the forward end of the intercooler. The member 75 is preferably formed of channel stock and is positioned so that its broad web faces rearwardly. The forward ends of the multi-layer assemblies or sandwiches are engaged against the member 75 and are secured thereto by rivets 76. There is a tubular rivet 76 secured to the pair of tube plates 65 of each sandwich. The shanks of the rivets are split at 77 as shown in Figure 13 to straddle the plates 65 and are silver soldered to the plates. The rivets 76 are engaged through openings in the annular support 75 and are then headed up or spun over to attach the sandwiches to the member.

Figure 14:
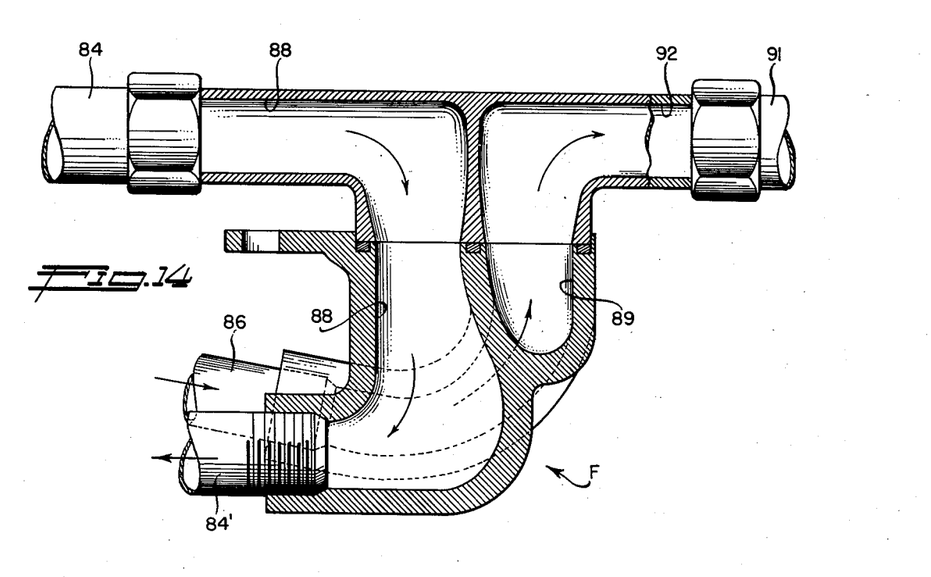
Figure 14 is an enlarged fragmentary sectional view of the coolant circulating manifold.
Figure 15:
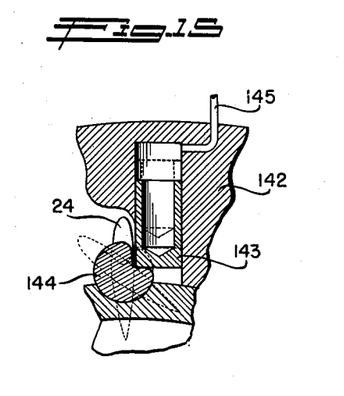
Figure 15 is an enlarged diagrammatic fragmentary sectional view taken as indicated by line 15—15 on Figure 12.

The above described legs 66 are utilized to support or carry the rear ends of the intercooler assemblies. A pair of spaced concentric header pipes 78 and 79 is positioned at the rear of the intercooler. The inner annular pipe 78 is provided to distribute the eutectic or coolant to the tubes 68 and the outer pipe 79 serves to carry the cooling medium from the several tubes. The legs 66 engage against the spaced pipes and have extensions 80 of reduced diameter communicating with openings 81 in the walls of the tubes. The extensions 80 are silver soldered to the pipes 78 and 79 to provide fluid-tight seals around the openings 81 and to secure the rear end of the intercooler assembly to the supporting pipes. With the construction just described, the rear end of the intercooler core is dependably supported on the manifold tubes or pipes 78 and 79. In the event of clogging or leaking of one of the sandwiches, the rivet 76 supporting the forward end of that sandwich is drilled out or its head is removed and the extensions 80 at the rear end of the sandwich are disengaged from the openings 81. This frees the defective sandwich for removal and replacement. It will be noted that restriction or clogging of one or more sandwich passages 68 does not interfere with the free flow of cooling medium through the other passages 68.

The system F for supplying the cooling medium to the intercooler E is thermostatically controlled to respond to the temperature of the compressed air at the downstream side of the intercooler. The system includes a reservoir 83 for the liquid cooling medium and a conduit 84 leading from the reservoir. The reservoir may be suitably located at the exterior of the power plant. A suitable pump 85 is interposed in the conduit 84 and is operable to supply the liquid cooling medium to the intercooler at a substantial pressure. The pump 85 is preferably mounted on the exterior of the compressor casing 10—25 and is preferably of the vane type design to operate at high velocities. It is preferred to drive the pump 85 by one of the radial shafts 36 so that its rate of operation is proportional to the power plant speed.

The system F further includes a pipe 86 for carrying the cooling medium from the annular manifold 79. In practice it is preferred to lead both the pipes 84 and 86 to a multiple flow manifold 87. The manifold 87 is bolted or otherwise secured to the wall of the casing 25, and has a passage 88 which receives the liquid cooling medium from the line 84, and which directs it radially inward to a conduit 84' leading to the manifold pipe 78. The flow manifold 87 also has a passage 89 having a vertical arm which communicates with the pipe 86 and a horizontal arm communicating with a pipe 90 for conducting the coolant rearwardly at the exterior of the power plant to a radiator G. A pipe 91 returns from the radiator G to the flow manifold 87 where it communicates with a passage 92. A pipe 93 extends from the passage 92 to the reservoir 83 to complete the cycle or path of the coolant flow. The details of the radiator G will be subsequently described.

The system F further includes a by-pass valve 95 in the manifold 87 and a thermostatic control for the valve. As best shown in Figure 10, the valve 95 is of the poppet type and controls a port 96 which connects the above mentioned passages 89 and 92. The by-pass port 96 is of substantial capacity and is located so that there is always a maximum circulation of coolant through the intercooler E to insure a uniform temperature distribution at the entrance of the high speed compressor B. The valve 95 which is adapted to cooperate with a seat on the wall of the passage 92 to control the port 96, is actuated by a pneumatic cylinder and piston mechanism. This mechanism which is mounted on the manifold 87, includes a cylinder 97 and a piston 98 operating in the cylinder. A head or spider 99 is arranged across the inner end of the cylinder and has a tubular guide 100 extending across the passage 92. An atmospheric bleed 200 communicates with the inner end of the cylinder 97. The valve 95 preferably has an elongate socket 101 slidably receiving the guide 100 to provide a desirable dashpot action and to direct the valve. A valve operating rod 102 slidably passes through the guide 100 and has its inner end attached to the valve 95. The outer end of the rod is secured to the piston 98. A light compression spring 103 urges the piston 98 outwardly and therefore urges the valve 95 toward the open position. A rod 104 on the outer end of the piston is adapted to extend from the cylinder 97 to indicate the position of the valve 95. It is to be observed that the pump 85 and valve 95 are related in the system F so that there is a full circulation of coolant through the intercooler E, even when the valve is in the closed or partially closed position.

A thermostatic or temperature sensitive means is provided to control the cylinder and piston mechanism just described. The temperature sensitive means is arranged in the passage 42 at the downstream side of the intercooler E, being supported by a suitable bracket 105 on the support member 75. The thermostatic means includes an elongate outer tube 106 supported at one end by the bracket 105 and having a cap 107 brazed or otherwise fixed to the same end. A tubular valve fitting 108 is fixed to the other end of the outer tube 106 and has communication with a pipe or conduit 109. An inner tube 110 is spaced within the outer tube in concentric relation thereto and has one end anchored at the cap 107. A member 111 is fixed in the end of the tube 110 and has a shoulder 112 opposing the end wall of the cap 107. A nut 113 is threaded on the member 111 to cooperate with the outer end of the cap. Shims 114 are engaged between the shoulder 112 and the inner end surface of the cap. It will be seen that upon adjustment of the nut 113 and shims 114 the tube 110 may be adjusted longitudinally with respect to the outer tube 106. The inner tube 110 is unrestrained and free for longitudinal thermal expansion and contraction throughout its length except at its point of attachment to the member 111. The inner and outer tubes 110 and 106 are formed of metals having dissimilar coefficients of thermal expansion and the relative movement between the tubes, resulting from variations in the temperature of the compressed air flowing through the passage 42, is utilized to control a valve, which in turn governs the above described piston 98. In practice, the outer tube 106 may be formed of Dural while the inner tube 110 is formed of Invar steel. It will be noted that the thermostat extends transversely across the passage 42 to respond to the average temperature of the compressed air flowing therethrough.

I employ the air under pressure in the passage 42 to operate the valve actuating piston 98. A port 115 in the member 111 carries this air under pressure into the inner tube 110. The inner tube 110 is provided at its free or unsupported end with an inner valve member 116 which slidably engages in the bore of the above mentioned valve fitting 108. The inner valve member 116 has a central port 117 communicating with the interior of the inner tube 110. It is desirable to filter or screen the air under pressure being supplied to the cylinder 97, and it is also important to distribute the air flow through the tube assembly to obtain a uniform heat distribution in the temperature sensitive device. Accordingly an elongate tubular metal screen 118 has one end anchored on the member 111 and has its other end secured in the port 117 to extend longitudinally through the inner tube 110 and to "screen" the air under pressure supplied to the port 117. The valve means of the temperature responsive unit includes a series of annular grooves 119 in the periphery of the inner valve member 116 and a similar set of annular grooves 120 in the internal wall of fitting 108. The grooves 119 and 120 are related so as to move into and out of communication when an increase or decrease in the temperature of the air flowing through the passage 42 results in relative movement between the tubes 106 and 110. Radial ports 121 in the wall of the valve member 116 maintain the port 117 in communication with the grooves 119. One or more axial ports 122 in the fitting 108 maintain the grooves 120 in communication with the conduit 109. The conduit 109 extends to the upper end of the cylinder 97 to carry the actuating air under pressure to the piston 98. With the parts in the positions illustrated in Figure 11, the air pressure supply to the cylinder 97 is cut off and the spring 103 urges the valve 95 to the open position. This is the condition of the parts when the temperature of the air leaving the downstream side of the intercooler E is below a selected or predetermined value. It is to be understood that there is a slight leakage of air pressure past or around the piston 98 to permit movement of the piston by the spring 103 when the valve parts of the thermostatic means are in the position of Figure 11. When the valve 95 is thus moved to an open position, the liquid cooling medium is free to flow from the passage 89 to the passage 92. Thus a substantial portion of the coolant by-passes the radiator G, or at least is not circulated through the radiator. As a result, the temperature of the coolant increases and the temperature of the air under pressure flowing through the passage 42 increases. When the temperature of the air in the passage 42 reaches a given value, the relative movement between the tubes 106 and 110 brings the grooves 119 into communication with the grooves 120, and air under pressure is again supplied to the cylinder 97. The air pressure acting on the piston 98 moves the valve 95 toward the closed position, and thus restricts or cuts off the flow of the cooling medium through the by-pass port 96. As a result of this, a greater proportion of the cooling medium is circulated through the radiator G and a greater exchange of heat occurs at the intercooler E to reduce the temperature of the air flowing through the intercooler. From the above it will be seen that the intercooler E and the control system F operate to maintain the temperature of the air flowing between the compressors A and B substantially constant, and therefore assist in preserving a generally isothermal condition in the working circuit of the power plant.

Figure 2:
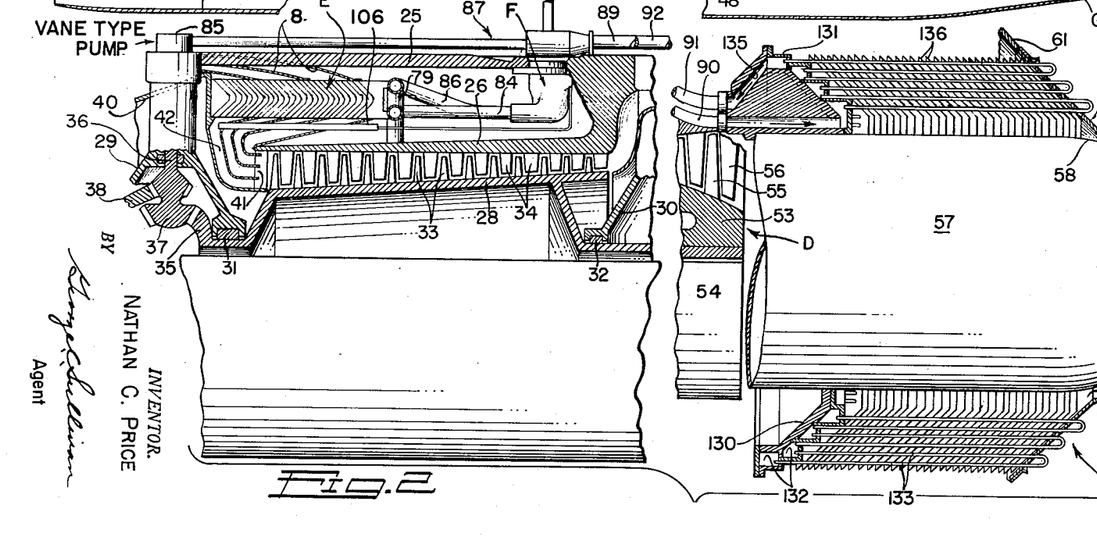
Figure 2 is an enlarged fragmentary longitudinal section illustrating the intercooler and radiator, together with the associated power plant elements, with the combustion chamber and a portion of the turbine broken away.
Figure 3:
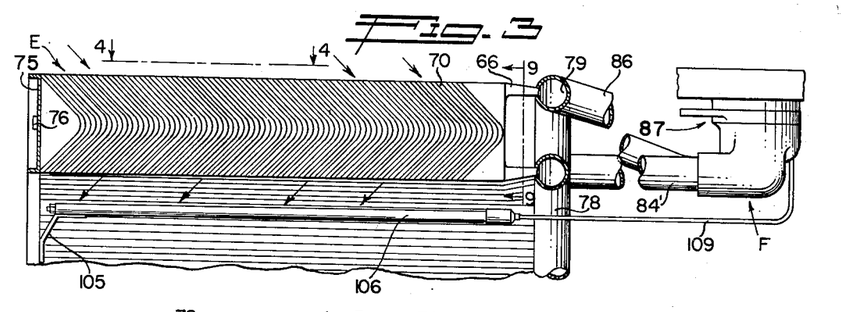
Figure 3 is an enlarged longitudinal fragmentary sectional view of the intercooler and its header pipes showing the grooved face of one of the fin plates and illustrating the direction of air flow through the intercooler.

In accordance with the invention, any suitable form of radiator may be employed to extract the unwanted heat from the cooling medium subsequent to its passage through the intercooler E. In the drawings I have shown a preferred radiator G arranged to utilize the air flow in the shroud 61 to reduce the temperature of the cooling medium, the heat thus removed being restored to the working cycle of the power plant when the air from the shroud 61 is introduced through the augmenter passage 59. The radiator G includes an annular apron or wall 130 surrounding the above described pipe 57. The wall 130 is spaced forwardly from the apron 9 and is flared so as to be substantially parallel with the apron. A stepped jacket 131 is associated with the wall 130. The jacket has a plurality of annular gradations or steps engaged with the face of the sloping wall 130 to define a plurality of annular spaces 132. The radiator further comprises a plurality of U flow tubes 133. There is a series of tubes 133 having their receiving ends in communication with the innermost annular space 132. This series of tubes 133 extends axially to the apron 9 where they are supported in openings therein and then return axially or forwardly to discharge into the succeeding annular space 132. Annular series of the return or U flow tubes 133 extend between and connect each successive pair of adjacent fluid spaces 132. Heat radiating fins 136 are associated with the tubes 133 to assist in the dissipation of the heat from the coolant. The fins may be arranged in generally parallel relation with the apron 9 and assist in directing the air from the passage 62 to the augmenter passage 59.

The cooling medium, raised in temperature during its passage through the intercooler, flows through the passage 89 and communicating pipe 90 to the innermost annular space 132. The liquid then progressively flows through the successive series of tubes 133 to ultimately reach the outer space 132. A passage 135 conducts the liquid from this outermost space 132 to the pipe 91, which in turn conveys it to the passage 92 of the manifold 87. It will be apparent how the liquid cooling medium circulated through the successive series of tubes 133 is effectively cooled before it is re-cycled through the intercooler E. The heat extracted from the coolant by the air flowing through the radiator G is restored to the working stream of the power plant by the air entering the augmenter passage 59 to become commingled with the main stream of the exhausting working fluid. It will be observed that the system F and the associated radiator G constitute a closed system which is automatically controlled by the temperature responsive means to maintain a substantially isothermal condition in the compressed air supply phase of the power plant cycle to materially aid in preserving a high overall efficiency, even under varying load conditions and where the altitude and temperature of the ambient air vary greatly.

As mentioned above, the speed of the floating drum section 18 of the compressor A is controlled with respect to the speed of the main rotor 11 to compensate for variations in the air pressure at the inlet spider 14, such variations resulting from changes in the speed of the aircraft, altitude and general ambient atmospheric conditions. The variable speed hydraulic drive 21 between the rotor 11 and the forward drum section 18 of the compressor A is regulated by varying the pitch or effective angle of the vanes 24. The means for regulating the hydraulic drive includes an aneroid 137 responsive to the pressure in the passage 42 which leads from the discharge of the compressor A to the inlet of compressor B. As illustrated in Figure 12, the aneroid 137 is contained within a capsule or chamber 138 which is maintained in communication with the compressed air passage 42 by a duct 139. The action of the aneroid 137 is modulated by a second aneroid 140 arranged where it is subjected to the ambient atmospheric pressure. In the case illustrated, a stem or rod 141 connects the active diaphragms of the aneroids 137 and 140 so that the aneroid 140 acts in opposition to the aneroid 137.

The aneroid 137 regulates a fluid pressure control system which in turn governs the vanes 24 of the variable speed hydraulic coupling 21. This system includes a cylinder 142 adjacent each vane 24 and a piston or plunger 143 movable in each cylinder to act on the shaft 144 of the adjacent vane 24. The plungers 143 are operable to rotate or turn their respective vanes 24. Lines 145 extend from the cylinders 142 to a fluid pressure line 146. The line 146 handles a suitable liquid; for example, a hydraulic fluid, and cycles the liquid from a reservoir 147 to adjacent the aneroid 137 and then back to the reservoir. A pump 148 circulates the liquid through the line 146 under a suitable pressure and may be driven by one of the radial shafts 136 of the power plant. The above mentioned stem 141 of the aneroid 137 acts as a valve to control the pressure in the line 146 and therefore, in the cylinders 142. The stem 141 passes through a valve fitting 150 in the line 146 and has a transverse port or groove 151 for cooperating with the fitting to control the flow through the line. The construction is such that upon the development of excessive air pressure in the passage 42, the aneroid 137 is partially compressed to move the stem 141 and thereby cause the fluid pressure in the line 146 and cylinders 142 to gradually disengage the hydraulic drive or clutch 21. Conversely, a deficient pressure in the passage 42 results in a gradual engagement or increased drive through the hydraulic clutch mechanism 21 connecting the rotor 11 and drum section 18. For each given altitude there is a preferred pressure to be established in the passage 42. The action of the aneroid 137 in controlling the hydraulic coupling, increases the pressure in the passage 42 at the lower altitudes and decreases this pressure at the higher altitudes. A pipe 155 connects spaced portions of the line 146 so as to be in by-passing relation to the valve 151 and a pressure relief or constant pressure valve 156 is connected in this by-pass. The aneroid control system just described is operable to vary the rotative speeds of the forward section 18 of the compressor A from between 5,000 and 8,000 R. P. M. in a typical instance to maintain a constant proportional ratio between the inducted air weight and the flow rate of air for each altitude.

The main rotors 11, 28 and 53 of the power plant are operated at a generally constant rotative speed. The described control system incorporating devices for temperature and pressure regulation of the air, affecting density according to Boyle's law and Charles' law, provides a substantially constant volumetric flow of air to these rotors, at different altitudes and translational speeds of the flight vehicle, whereby design Q/N which is the ratio of volumetric flow to rotative speed, is maintained constant for high power plant efficiency.

Having described only a typical form of the invention, I do not wish to be limited to the specific details herein set forth, but wish to reserve to myself any variations or modifications that may appear to those skilled in the art and/or fall within the scope of the following claims.

I claim:

1. In an aircraft power plant having a combustion chamber the combination of; a multi-stage compressor for supplying compressed air to the combustion chamber, and control means for maintaining substantially constant conditions of the working fluid of the power plant at intermediate points in the internal flow system of the power plant during variations of imposed altitude pressure and temperature, said control means including an intercooler in the path of the air flowing between the stages of the compressor, a radiator, a system for circulating a cooling medium through the intercooler and radiator, thermostatic means sensitive to the temperature of the compressed air at the downstream side of the intercooler for regulating the flow of cooling medium through said system to vary the rate of heat absorption of the intercooler, a compressor rotor at the inlet of said compressor, a variable speed drive for said rotor, and means responsive to the pressure in said flow path for controlling the said variable speed drive.

2. In an aircraft power plant; the combination of a multi-stage air compressor including a compressor stage having an annular discharge passage, another compressor stage having an annular air receiving passage, and having a third annular passage connecting said discharge and receiving passages, an annular intercooler in said third passage to be in the path of the air flowing between said stages, a radiator, a system for circulating a cooling medium through the intercooler and radiator to absorb heat from the air at the intercooler and to reject the heat at the radiator, and means for controlling the flow of cooling medium through said system to govern the heat absorption rate of the intercooler including a temperature responsive device arranged in said third passage at the downstream side of the intercooler.

3. In an aircraft power plant, a multi-stage air compressor, an intercooler arranged in the path of the air flowing between the stages of the compressor, a radiator, a conduit system for circulating a cooling medium through said intercooler and radiator, said system having a by-pass for by-passing said medium around the radiator, valve means for the by-pass for regulating the flow of said medium through said radiator, and means sensitive to the temperature of the compressed air at the downstream side of the intercooler for controlling said valve means.

4. In an aircraft power plant, a multi-stage air compressor including axially aligned axial flow compressor stages and an annular air flow passage connecting said stages, an annular intercooler arranged in said passage to be in the path of the air flowing between the stages of the compressor, a radiator, a conduit system for circulating a cooling medium through said intercooler and radiator, said system having a by-pass for by-passing said medium around the radiator, a valve for controlling the by-pass, and means sensitive to the temperature of the compressed air in said passage at the downstream side of the intercooler for regulating the valve.

5. In an aircraft power plant, a multi-stage air compressor, an intercooler arranged in the path of the air flowing between the stages of the compressor, a radiator, a conduit system for circulating a cooling medium through said intercooler and radiator, said system having a by-pass for by-passing said medium around the radiator, a fluid pressure actuated valve means for controlling the by-pass, and thermostatic means sensitive to the temperature of the air at the downstream side of the intercooler for governing the application of air compressed by said compressor to said valve to regulate the same.

6. In an aircraft power plant, a multi-stage air compressor, an intercooler arranged in the path of the air flowing between the stages of the compressor, a radiator, a conduit system for circulating a cooling medium through said intercooler and radiator, said system having a by-pass for by-passing said medium around the radiator, a valve for controlling the by-pass, a piston for operating the valve, a system for delivering air compressed by said compressor to the piston to actuate the same, and thermostatic means affected by the temperature of the compressed air at the downstream side of the intercooler for regulating the delivery of the actuating compressed air to the piston.

7. In an aircraft power plant, a multi-stage air compressor, an intercooler arranged in the path of the air flowing between the stages of the compressor, a radiator, a conduit system for circulating a cooling medium through said intercooler and radiator, said system having a by-pass for by-passing said medium around the radiator, a valve controlling the by-pass, a cylinder and piston device for operating the valve, a line for carrying compressed air compressed by the compressor to said device to operate the same, and thermostatic means responsive to the temperature of the compressed air for controlling said line.

8. In a power plant having a gas turbine with an exhaust pipe and an augmenter passage around the exhaust pipe, the combination of a first stage compressor, a second stage compressor, an air passage between and directly connecting said compressors, an intercooler arranged across said passage for absorbing heat from the compressed air flowing from the first stage compressor to the second stage compressor, a duct for carrying atmospheric air to the augmenter passage, a radiator in the augmenter passage to be in the path of said atmospheric air, a system for circulating a cooling medium through the intercooler and radiator, and thermostatic means sensitive to the temperature of the compressed air at the downstream side of the intercooler for regulating the flow of cooling medium through the radiator.

9. In a power plant, a first compressor having a main rotor, and a separate rotor section at its inlet, a second compressor, means for driving the second compressor and the main rotor of the first compressor, a variable speed drive for said rotor section, an intercooler in the air flow path between said compressors, means sensitive to the temperature of the compressed air in said flow path for adjusting the heat absorption rate of the intercooler, and means sensitive to the pressure of the air in said flow path for controlling said variable speed drive.

10. In a power plant, a first compressor having a main rotor, and a separate rotor section at its inlet, a second compressor, means for driving the second compressor and the main rotor of the first compressor, a variable speed drive for said rotor section, an intercooler in the air flow path between said compressors, a coolant circulating system for the intercooler, thermostatic means sensitive to the temperature of the compressed air in said flow path for controlling said system, and means responsive to the pressure in said flow path for controlling said variable speed drive.

11. In a power plant, a multi-stage axial flow air compressor including an annular air flow passage connecting the stages thereof, an annular intercooler arranged in said annular passage to be in the path of the air flowing between the stages of the compressor, a radiator, a system for circulating a cooling medium through the intercooler and radiator, and means sensitive to the temperature of the compressed air for regulating said system to govern the heat absorption rate of the intercooler, said means including a thermostat device extending transversely across said air flow passage at the down stream side of the intercooler to be sensitive to the average temperature of the air flowing through said passage, and valve means controlled by said device for regulating the flow of said medium to the radiator.

NATHAN C. PRICE.

REFERENCES CITED

The following references are of record in the file of this patent:

UNITED STATES PATENTS

| Number | Name | Date |
| --- | --- | --- |
| 1,045,961 | De Ferranti | Dec. 3, 1912 |
| 1,128,265 | Wittemann | Feb. 9, 1915 |
| 1,582,028 | Dunn | Apr. 27, 1926 |
| 2,077,625 | Higgins | Apr. 20, 1937 |
| 2,078,956 | Lysholm | May 4, 1937 |
| 2,342,164 | Pinkel | Feb. 22, 1944 |
| 2,346,178 | Mercier | Apr. 11, 1944 |
| 2,361,691 | Jendrassik | Oct. 31, 1944 |
| 2,372,272 | Helmore | Mar. 27, 1945 |
| 2,390,161 | Mercier | Dec. 4, 1945 |
| 2,396,484 | Allen et al. | Mar. 12, 1946 |
| 2,403,398 | Reggio | July 2, 1946 |
| 2,428,830 | Birmann | Oct. 14, 1947 |

FOREIGN PATENTS

| Number | Country | Date |
| --- | --- | --- |
| 445,550 | Great Britain | Apr. 9, 1936 |